(12) United States Patent  (10) Patent No.: US 8,058,833 B2
Wilkens  (45) Date of Patent: Nov. 15, 2011

(54) FINE RESOLUTION MOTOR CONTROL

(75) Inventor: Dean Wilkens, Scottsdale, AZ (US)

(73) Assignee: Honeywell International Inc., Morristown, NJ (US)

(*) Notice: Subject to any disclaimer, the term of this patent is extended or adjusted under 35 U.S.C. 154(b) by 528 days.

(21) Appl. No.: 12/260,763

(22) Filed: Oct. 29, 2008

(65) Prior Publication Data

US 2010/0102765 A1 Apr. 29, 2010

(51) Int. Cl.
*G05D 23/275* (2006.01)
*H02P 6/16* (2006.01)
*G05B 19/31* (2006.01)
*H02P 1/46* (2006.01)
*H02P 27/00* (2006.01)
*H03M 1/48* (2006.01)

(52) U.S. Cl. .......... 318/632; 318/400.04; 318/605; 318/701; 318/738; 341/116

(58) Field of Classification Search ............. 318/400.04, 318/632, 701, 738, 605; 341/116
See application file for complete search history.

(56) References Cited

U.S. PATENT DOCUMENTS

| | | | |
|---|---|---|---|
| 4,442,386 A | 4/1984 | Uchida et al. | |
| 4,520,300 A | 5/1985 | Fradella | |
| 4,658,190 A * | 4/1987 | Miyazaki et al. | 318/400.23 |
| 5,059,900 A | 10/1991 | Phillips | |
| 5,155,696 A | 10/1992 | Shibata et al. | |
| 5,239,473 A | 8/1993 | Ribbens et al. | |
| 6,198,275 B1 | 3/2001 | Wolf et al. | |
| 6,433,536 B1 | 8/2002 | Yundt et al. | |
| 6,534,970 B1 | 3/2003 | Ely et al. | |
| 6,552,453 B2 | 4/2003 | Ohiwa et al. | |
| 6,600,308 B2 | 7/2003 | Shirai et al. | |
| 6,622,391 B1 | 9/2003 | Shirai et al. | |
| 6,690,159 B2 | 2/2004 | Burreson et al. | |
| 6,744,230 B2 * | 6/2004 | Hill et al. | 318/400.04 |
| 6,931,918 B2 * | 8/2005 | Herb | 73/114.26 |
| 7,230,422 B2 | 6/2007 | Morita, Jr. et al. | |
| 7,446,498 B2 * | 11/2008 | Cheng et al. | 318/609 |
| 7,579,799 B2 * | 8/2009 | Robichaux et al. | 318/400.38 |
| 2004/0080290 A1 * | 4/2004 | Hill et al. | 318/254 |

OTHER PUBLICATIONS iC-MH 12 Bit Angular Hall Encoder, Preliminary IC Haus [online]. Copyright 2007 iC-Haus. Retrieved from Internet: <URL: www.ichaus.com>.

* cited by examiner

*Primary Examiner* — Walter Benson
*Assistant Examiner* — Gabriel Agared
(74) *Attorney, Agent, or Firm* — Ingrassia Fisher & Lorenz, P.C.

(57) ABSTRACT

Methods and apparatus are provided for deriving precision position and rate information for motors using relatively low precision analog sensors, and for implementing compensation techniques that overcome inherent sensor errors and rotor magnet flux tolerances.

19 Claims, 3 Drawing Sheets

FINE RESOLUTION MOTOR CONTROL

TECHNICAL FIELD

The present invention generally relates to motor control and, more particularly, to a system and method for implementing fine resolution motor control using analog Hall-effect sensors.

BACKGROUND

Electric motors, such as brushless motors, may be used for many different applications. In many instances, analog Hall-effect sensors are used for sensing rotor position in brushless motors where, for example, trapezoidal commutation is employed. This can be a cost effective solution when precision motor control is not needed. However, for precision motor (e.g., fine resolution) control applications, which employ sinusoidal or field oriented control commutation, relatively higher resolution position and rate sensing may be needed. Historically, this higher resolution sensing has been accomplished with relatively more expensive and complex resolver type AC sensors and resolver to digital conversion circuitry.

Recently, other techniques have been implemented that use relatively low-cost analog Hall-effect sensors. In accordance with these techniques, analog Hall-effect sensors generate three sinusoidal signals representative of the position of the motor rotor. Using a rigorous mathematical approach, the rotor position and rate may then be derived. One example of a mathematical approach, which is disclosed in U.S. Pat. No. 6,744,230, combines the three sinusoidal signals into two orthogonal vectors using known trigonometric identities. Standard arctangent algorithms and other trigonometric identities may then be used to derive the rotational position and rate from the orthogonal vectors.

While the above described mathematical technique works quite well, it can exhibit certain drawbacks. For example, the derived position and rate can be subject to a number of errors. These errors may be associated with individual Hall-effect sensors or specific magnet poles. In particular, the Hall-effect sensor errors may arise from positioning errors (phase and amplitude) and/or from electrical offset of the sensors. The magnet pole errors may appear as overall magnetic flux intensity variations or distortions in the sinusoidal waveform.

Hence, there is a need for a relatively low-cost motor control scheme that may implement fine resolution motor control and that overcomes inherent sensor errors and rotor magnetic flux intensity variation errors. The present invention addresses at least this need.

BRIEF SUMMARY

In one embodiment, and by way of example only, a method of generating a motor control signal for a motor having a rotor that rotates at a rotational rate includes generating first, second, and third sinusoidal signals, with each sinusoidal signal being 120-degrees out of phase with the other sinusoidal signals. the first, second, and third sinusoidal signals are differentiated to obtain first, second, and third cosine signals, respectively. The first sinusoidal signal is subtracted from the third sinusoidal signal to obtain a first sinusoidal difference signal, the second sinusoidal signal is subtracted from the first sinusoidal signal to obtain a second sinusoidal difference signal, and the third sinusoidal signal is subtracted from the second sinusoidal signal to obtain a third sinusoidal difference signal. The first sinusoidal difference signal and the second cosine signal are multiplied to obtain a first product signal, the second sinusoidal difference signal and the third cosine signal are multiplied to obtain a second product signal, and the third sinusoidal difference signal and the first cosine signal are multiplied to obtain a third product signal. The first, second, and third product signals are summed to obtain a summation signal, and the summation signal is multiplied by a constant to obtain a rate signal that is proportional to the rotational rate of the rotor.

In another exemplary embodiment, a motor controller includes first, second, and third sensor means, first, second, and third differentiation means, first, second, and third, subtraction means, first, second, third, and fourth multiplication means, and summing means. The first, second, and third sensor means generate first, second, and third sinusoidal signals, respectively, with each sinusoidal signal being 120-degrees out of phase with the other sinusoidal signals. The first, second, and third differentiation means differentiate the first, second, and third sinusoidal signals, respectively, to generate first, second, and third cosine signals, respectively. The first subtraction means subtracts the first sinusoidal signal from the third sinusoidal signal to generate a first sinusoidal difference signal, the second subtraction means subtracts the second sinusoidal signal from the first sinusoidal signal to generate a second sinusoidal difference signal, and the third subtraction means subtracts the third sinusoidal signal from the second sinusoidal signal to generate a third sinusoidal difference signal. The first multiplication means multiplies the first sinusoidal difference signal and the second cosine signal to generate a first product signal, the second multiplication means multiplies the second sinusoidal difference signal and the third cosine signal to generate a second product signal, and the third multiplication means multiplies the third sinusoidal difference signal and the first cosine signal to generate a third product signal. The summing means sums the first, second, and third product signals to generate a summation signal, and the fourth multiplication means multiplies the summation signal by a constant to generate a rate signal that is proportional to the rotational rate of the rotor.

In still another exemplary embodiment, a motor control system includes a motor, first, second, and third sensors, and a motor controller. The motor includes a stator and a rotationally mounted rotor. The rotor is configured, upon the stator being controllably energized, to rotate to a rotational position at a rotational rate. The first, second, and third sensors are evenly spaced about the rotor to sense the rotational position thereof and supply first, second, and third sinusoidal sensor signals, respectively. Each sinusoidal sensor signal is 120-degrees out of phase with the other sinusoidal sensor signals. The motor controller is coupled to receive each of the sinusoidal sensor signals and is configured to controllably energize the stator from a power source. The motor controller includes first, second, and third differentiation means, first, second, and third, subtraction means, first, second, third, and fourth multiplication means, and summing means. The first, second, and third differentiation means differentiate the first, second, and third sinusoidal signals, respectively, to generate first, second, and third cosine signals, respectively. The first subtraction means subtracts the first sinusoidal signal from the third sinusoidal signal to generate a first sinusoidal difference signal, the second subtraction means subtracts the second sinusoidal signal from the first sinusoidal signal to generate a second sinusoidal difference signal, and the third subtraction means subtracts the third sinusoidal signal from the second sinusoidal signal to generate a third sinusoidal difference signal. The first multiplication means multiplies the first sinusoidal difference signal and the second cosine signal to generate a first product signal, the second multiplication means multiplies the second sinusoidal difference signal and the third cosine signal to generate a second product signal, and the third multiplication means multiplies the third sinusoidal difference signal and the first cosine signal to generate a third product signal. The summing means sums the first, second, and third product signals to generate a summation signal, and the fourth multiplication means multiplies the summation signal by a constant to generate a rate signal that is proportional to the rotational rate of the rotor.

In yet another exemplary embodiment, a self-calibrating complementary filter includes subtraction means, gain adjustment means, first and second integration means, multiplication means, and summing means. The subtraction means receives a filtered position signal and a position signal and subtracts the filtered position signal from the position signal to supply a position error signal. The gain adjustment means applies a predetermined gain to the position error signal to supply an adjusted position error signal. The first integration means integrates the position error signal and supplies a rate adjustment signal. The multiplication means for receives a rate signal and the rate adjustment signal and multiplies the rate signal and the rate adjustment signal to generate an adjusted rate signal. The summing means sums the adjusted rate signal and the adjusted position error signal to generate the filtered rate signal. The second integration means integrates the filtered rate signal to obtain the filtered position signal.

Other desirable features and characteristics of the present invention will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
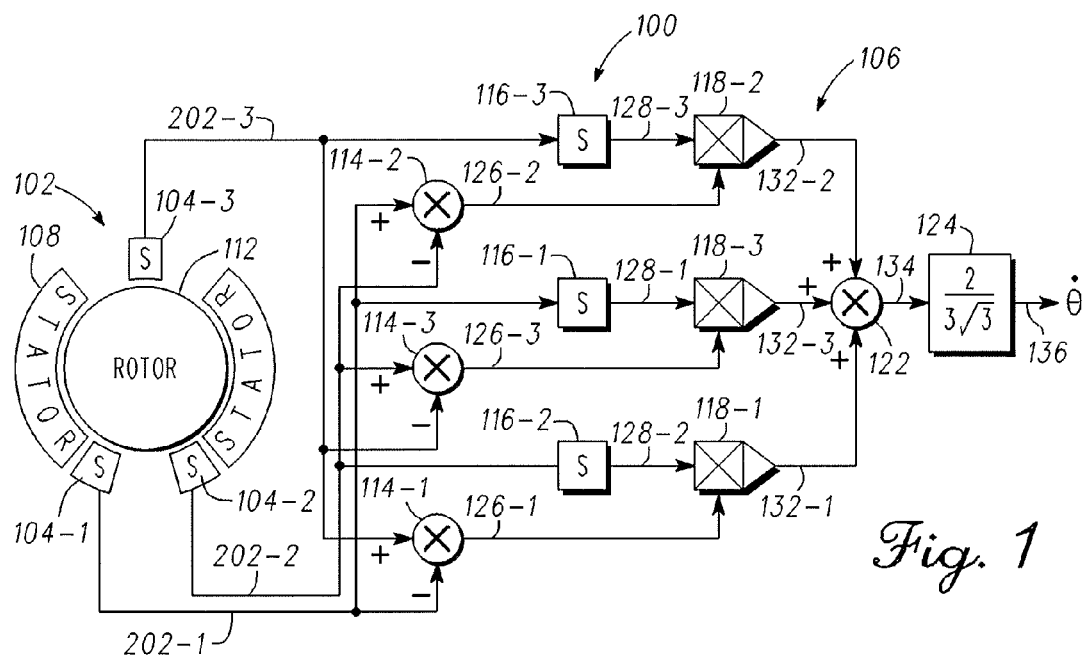
FIG. 1 is a block diagram of a motor control system including a portion of a motor controller that may be used to derive motor rotational rate according to an embodiment of the present invention.

Referring to FIG. 1, a functional block diagram of a motor control system 100 is depicted and includes a motor 102, a plurality of sensors 104, and a motor controller 106. In the depicted embodiment the motor 102 is implemented as a three-phase, two-pole brushless machine that includes a stator 108 and a rotor 112. As is generally known, the stator 108, when controllably energized, generates a rotating magnetic field that interacts with the rotor 112. The rotor 112 in turn rotates, generating a torque.

Figure 2:
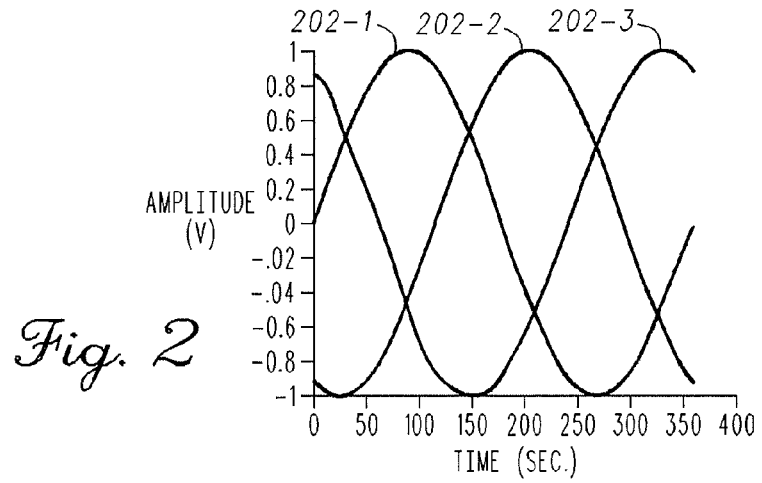
FIG. 2 depicts three ideal sinusoidal waveforms that are generated by three position sensors that may be used to implement the motor control system of FIG. 1.

The plurality of sensors 104 are evenly spaced about the rotor 112 and are configured to sense the rotational position thereof. In the depicted embodiment three analog Hall-effect sensors 104-1, 104-2, 104-3 spaced 120-degrees apart from each other are used. Analog Hall-effect sensors, as is generally known, generate a voltage signal having an amplitude that is proportional to sensed magnetic field strength. Thus, for the configuration depicted in FIG. 1 the sensors 104 generate three sinusoidal signals. As depicted in FIG. 2 these sinusoidal signals 202, referred to herein as a first sinusoidal signal 202-1, a second sinusoidal signal 202-2, and a third sinusoidal 202-3, are 120-degrees out of phase with each other. These sinusoidal signals are supplied to the motor controller 106.

The motor controller 106 receives the first, second, and third sinusoidal signals 202 and, implementing position and rate control, controllably energizes the motor stator 108 from a non-illustrated power source. As noted above, several mathematical approaches can be used to derive both position and rate from the three sinusoidal signals 202. In the depicted embodiment the motor controller 106 implements a derived rate algorithm that directly compensates for the previously-mentioned $3^{rd}$ harmonic magnet intensity distortion. Specifically, the rate algorithm is the sum of three derived rates in accordance with the following equation:

$$\dot{\theta} = \frac{2}{3\sqrt{3}}(X-Y)\dot{Z} + (Y-Z)\dot{X} + (Z-X)\dot{Y}.$$

The derivation of the above equation, for nominal sine wave magnets and with $3^{rd}$ harmonic distortion, is provided in the attached Appendix I. As is shown therein, the resulting equations are identical both with and without $3^{rd}$ harmonic distortion, which shows that $3^{rd}$ harmonic distortion is completely eliminated with this algorithm. Moreover, this algorithm provides uniform rate output for phase or amplitude errors that may be present due to Hall-effect sensor position errors. Returning once again to FIG. 1, it is seen that the motor controller 106, to implement the above algorithm, includes first, second, and third subtraction functions 114-1, 114-2, 114-3, first, second, and third differentiation functions 116-1, 116-2, 116-3, first, second, and third multiplication functions 118-1, 118-, 118-3, an addition function 122, and a fourth multiplication function 124.

The first subtraction function 114-1 is coupled to receive the first sinusoidal signal 202-1 and the third sinusoidal signal 202-3 and generates a first sinusoidal difference signal 126-1 representative of the mathematical difference between these two sinusoidal signals (e.g., (Z–X)). The second subtraction function 114-2 is coupled to receive the second sinusoidal signal 202-2 and the first sinusoidal signal 202-1 and generates a second sinusoidal difference signal 126-2 representative of the mathematical difference between these two sinusoidal signals (e.g., (X–Y)). The third subtraction function 114-3 is coupled to receive the third sinusoidal signal 202-3 and the second sinusoidal signal 202-2 and generates a third sinusoidal difference signal 126-3 representative of the mathematical difference between these two sinusoidal signals (e.g., (Y−Z).

The first differentiation function 116-1 is coupled to receive the first sinusoidal signal 202-1 and generates a first cosine signal 128-1 (e.g., $\dot{X}$) representative of the derivative of the first sinusoidal signal. The second differentiation function 116-2 is coupled to receive the second sinusoidal signal 202-2 and generates a second cosine signal 128-2 (e.g., $\dot{Y}$) representative of the derivative of the second sinusoidal signal. The third differentiation function 116-3 is coupled to receive the third sinusoidal signal 202-3 and generates a third cosine signal 128-3 (e.g., $\dot{Z}$) representative of the derivative of the third sinusoidal signal.

The first multiplication function 118-1 is coupled to receive the first sinusoidal difference signal 126-1 and the second cosine signal 128-2 and generates a first product signal 132-1 representative of the mathematical product of these two signals (e.g., (Z−X)$\dot{Y}$). The second multiplication 118-2 is coupled to receive the second sinusoidal difference signal 126-2 and the third cosine signal 128-3 and generates a second product signal 132-2 representative of the mathematical product of these two signals (e.g., (X−Y)$\dot{Z}$). The third multiplication function 118-3 is coupled to receive the third sinusoidal difference signal 126-3 and the first cosine signal 128-1 and generates a third product signal 132-3 representative of the mathematical product of these two signals (e.g., (Y−Z)$\dot{X}$).

The addition function 122 is coupled to receive the first, second, and third product signals from the first, second, and third multiplication functions 118-1, 118-2, and 118-3, respectively. The first addition function 122 is configured, upon receipt of these signals, to generate a summation signal 134 that is representative of the mathematical sum of the three signals (e.g., (X−Y)$\dot{Z}$+(Y−Z)$\dot{X}$+(Z−X)$\dot{Y}$). The summation signal 134 is supplied to the fourth multiplication function 124. The fourth multiplication function 124 is coupled to receive the summation signal 134 from the addition function 122. The fourth multiplication function 124 is configured, upon receipt of the summation signal 134, to multiply the summation signal 134 by a constant $$\left(e.g., \frac{2}{3\sqrt{3}}\right),$$

to thereby generate a rate signal 136 that is proportional to the rotational rate of the rotor 112.

In addition to deriving the rotational rate of the rotor 112, the motor controller 106 may also implement one or more algorithms to derive the rotational position of the rotor 112. For example, standard arctangent algorithms can be applied to determine 360-degree rotor position from sine and cosine signals derived from sinusoidal signals supplied from the plurality of sensors 104. One exemplary algorithm is disclosed in U.S. Pat. No. 6,744,230, which is assigned to the assignee of the instant application, and the entirety of which is incorporated herein by reference. In accordance with that algorithm, the three sinusoidal signals from the sensors 104 may be combined into two orthogonal vectors representative of the sine and the cosine of the instantaneous rotational position of the rotor 112. The instantaneous rotational position may be computed from the arctangent of these two signals.

No matter the specific manner in which the rotational position of the rotor 112 is derived, it is noted that residual errors in derived rotational rate are quite different from errors induced in computed rotational position, and most notably in an arctangent computed rotational position. In such instances, a complementary filter may be used to compute estimated rotor position and rotor rate. Such a complementary filter benefits from both the low frequency accuracy of arctangent computed rotor position and the high frequency stability of derived rotor rate. A first order complementary filter, such as the one disclosed in the above-mentioned U.S. Pat. No. 6,744,230, provides relatively smooth estimated rotor position and rotor rate. However, the dynamic response of this filter exhibits errors due to derived rate gain error. Because precision motor control relies on accurate feedback signals under dynamic conditions, this complementary filter may not be suitable. Instead, a complementary filter, such as the one depicted in FIG. 3, is preferably used.

Figure 3:
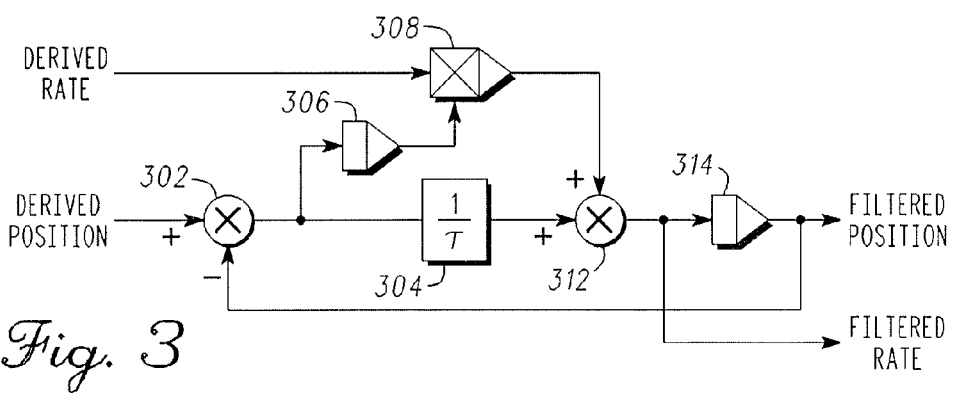
FIG. 3 depicts a block diagram of a complementary filter that may be used to implement the motor controller of FIG. 1.

As FIG. 3 depicts, the complementary filter 300 is coupled to receive a derived rotor rotational position signal and a derived rotor rotational rate signal and is configured to supply a filtered rotor rotational position signal and a filtered rotor rotational rate signal. The complementary filter 300 is a self-calibrating filter, and includes a subtraction function 302, a gain adjustment function 304, a first integration function 306, a multiplication function 308, a summation function 312, and a second integration function 314. The first subtraction function 302 is coupled to receive the derived rotational position and the filtered rotor rotational position and supplies a position error representative of the mathematical difference between the derived rotor rotational position and the filtered rotor rotational position. The position error is supplied to the gain adjustment function 304 and the first integration function 306.

The gain adjustment function 304 is configured, upon receipt of the position error, to apply a predetermined gain (1/τ) to the position error, and thereby generate an adjusted position error. The adjusted position error is supplied to the summation function 312. As is generally known, the parameter (τ) is representative of the smoothing function of the filter 300, and its value may be selected to meet desired filter characteristics.

The first integration function 306, as was noted above, is coupled to receive the position error. The first integration function 306, upon receipt of the position error, integrates the position error and supplies a rate adjustment to the multiplication function 308. The multiplication function 308, which also receives the derived rotor rotational rate, multiplies the derived rotor rotational rate and the rate adjustment to generate an adjusted rate. The adjusted rate is supplied to the summation function 312.

The summation function 312 receives the adjusted position error from the gain adjustment function 304 and the adjusted rate from the multiplication function 308. The summation function 312 sums the adjusted rate and the adjusted position error to generate the filtered rotor rotational rate. The filtered rotor rotational rate is also supplied to the second integration function 314. The second integration function 314 integrates the filtered rotor rotational rate to generate the filtered rotor rotational position.

Figure 4:
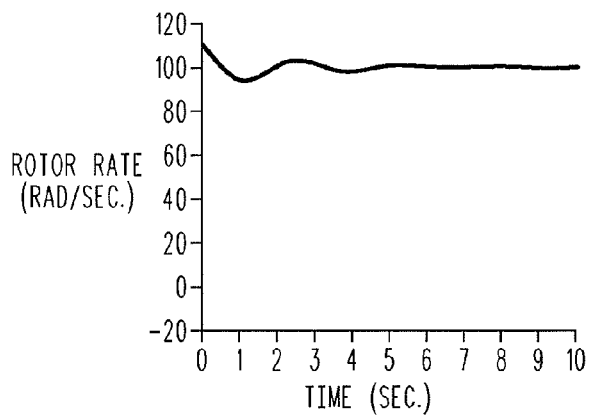
FIG. 4 depicts a 10 second calibration of rotor rotational rate for the complementary filter of FIG. 3.

The complementary filter 300 depicted in FIG. 3 and described above provides, via the first integration function 306 and the multiplication function 308, a calibration mechanism. That is, the position error is integrated to adjust the derived rate gain. Once this calibration is performed, the integrator value can be frozen or the calibration can be ongoing. In either case, once the calibration establishes the gain correction on the derived rotor rotational rate the filtered rotor rotational rate and position are accurate under static and dynamic conditions. This capability is illustrated in FIG. 4, which graphically depicts a 10 second calibration by the complementary filter 300. As may be seen, the filtered rotor rotational rate is initially around 110 rad/sec, but settles to the correct value of 100 rad/sec.

Figure 5:
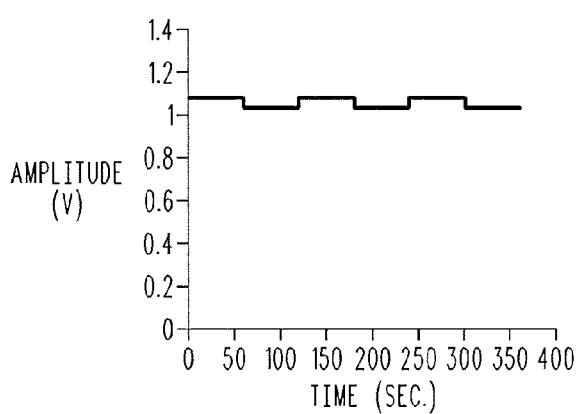
FIG. 5 a square wave characteristic of derived rotational rate that may occur when individual magnet rotor poles exhibit differing magnetic flux intensities.

The derived rate algorithm implemented by the motor controller 106, and which was described above, directly compensates for the $3^{rd}$ harmonic magnet intensity distortion, which was also previously described. Nonetheless, it is noted that individual magnet poles may exhibit differing magnetic flux intensities. Such variations between the individual magnet poles can result in the derived rotor rotational rate exhibiting a square wave characteristic, most notably with a two-pole rotor 112. More specifically, as the rotor 112 rotates through a full rotation, the alignment of the sensors 104 alternates, with two of the three sensors being aligned with one pole or the other. This alternating pattern results in the square wave rotor rotational rate signal, such as the one depicted in FIG. 5.

Figure 6:
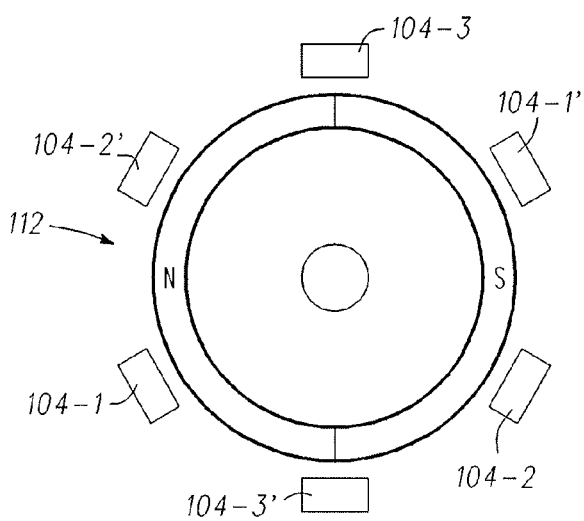
FIG. 6 an exemplary sensor alignment that may be used to implement magnetic flux intensity variation compensation.
Figure 7:
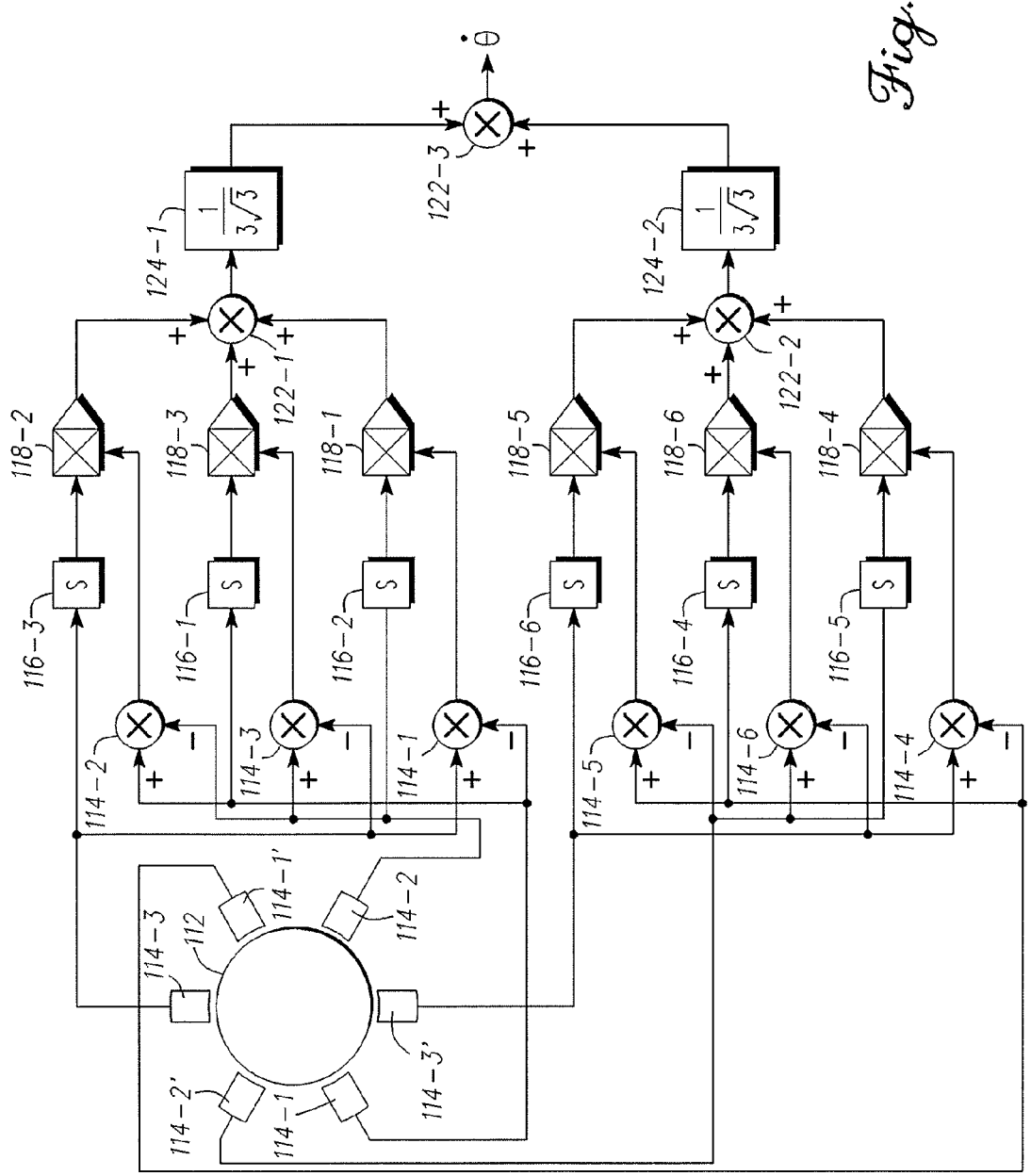
FIG. 7 depicts a portion of a motor controller that may be used to derive motor rotational rate and implement magnetic flux intensity variation compensation.

One method of compensating for the above-described characteristic, which is depicted in FIG. 6, is to position a second set of sensors (e.g., 104-1', 104-2', 104-3') 180-degrees apart from the first set of sensors (e.g., 104-1, 104-2, 104-3). The motor controller 106 is additionally configured to implement the derived rate algorithm for the second set of sensors. As depicted in FIG. 7, it may thus be appreciated that the motor controller 106 preferably further includes fourth, fifth, and sixth subtraction functions 114-4, 114-5, 114-6, fourth, fifth, and sixth differentiation functions 116-4, 116-5, 116-6, fifth, sixth, and seventh multiplication functions 118-5, 118-6, 118-7, a second addition function 122-2, and an eighth multiplication function 124-2. Also, the constant that the fourth and eighth multiplication functions 124-1, 124-2 each implement is $$\frac{1}{3\sqrt{3}},$$

rather than $$\frac{2}{3\sqrt{3}}.$$

Figure 8:
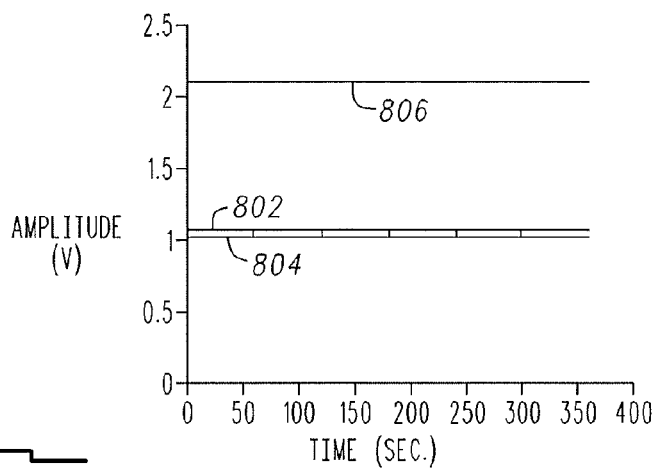
FIG. 8 depicts a derived rotor rotational rate, using the motor controller of FIG. 7, which is automatically compensated for individual magnet intensity variations.

Turning to FIG. 8, it is seen that the rotor rotational rate derived from the second set of sensors 104-1', 104-2', 104-3' produces a square wave rate signal 802 that is 180-degrees out of phase with the first derived rotor rotational rate signal 804. Thus, by summing these two derived rates together, via a third addition function 122-3 (see FIG. 7), individual magnet intensity variations are automatically compensated for in producing a relatively constant rate signal 806.

The system described herein provides a relatively low-cost, fine resolution motor control scheme that overcomes inherent sensor errors and rotor magnetic flux intensity variation errors. It will be appreciated that some or all of the described motor controller 106 may be implemented in hardware, software, firmware, or various combinations thereof. It will additionally be appreciated that some or all of the individual functions described herein may be implemented using analog components, digital components, or various combinations thereof.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

APPENDIX I

It is initially assumed that sinusoidal waveforms of the following form are supplied:

$X=\sin(\theta+30)$, $Y=\sin(\theta+150)$, $Z=\sin(\theta+270)$.

When the first derivative of each of these sinusoids is taken, the result is:

$\dot{X}=\dot{\theta}\cos(\theta+30)$, $\dot{Y}=\dot{\theta}\cos(\theta+150)$, $\dot{Z}=\dot{\theta}\cos(\theta+270)$.

Using known trigonometric identities, Equation 1 below may be derived as follows:

$$(X-Y)\dot{Z} + (Y-Z)\dot{X} + \qquad \text{(Equation 1)}$$
$$(Z-X)\dot{Y} = [\sin(\theta+30) - \sin(\theta+150)]\dot{\theta}$$
$$\cos(\theta+270) + [\sin(\theta+150) - \sin(\theta+270)]$$
$$\dot{\theta}\cos(\theta+30) + [\sin(\theta+270) - \sin(\theta+30)]$$
$$\dot{\theta}\cos(\theta+150)$$

$$(X-Y)\dot{Z} + (Y-Z)\dot{X} + (Z-X)\dot{Y} = [[\sin\theta\cos30 +$$
$$\cos\theta\sin30] - [\sin\theta\cos150 + \cos\theta\sin150]]$$
$$\dot{\theta}[\cos\theta\cos270 - \sin\theta\sin270] + [[\sin\theta\cos150 +$$
$$\cos\theta\sin150] - [\sin\theta\cos270 + \cos\theta\sin270]]$$
$$\dot{\theta}[\cos\theta\cos30 - \sin\theta\sin30] + [[\sin\theta\cos270 +$$
$$\cos\theta\sin270] - [\sin\theta\cos30 + \cos\theta\sin30]]$$
$$\dot{\theta}[\cos\theta\cos150 - \sin\theta\sin150]$$

$(X-Y)\dot{Z} + (Y-Z)\dot{X} + (Z-X)$ $$\dot{Y} = \left[\left[\frac{\sqrt{3}}{2}\sin\theta + \frac{1}{2}\cos\theta\right] - \left[-\frac{\sqrt{3}}{2}\sin\theta + \frac{1}{2}\cos\theta\right]\right]$$
$$\dot{\theta}[\sin\theta] + \left[\left[-\frac{\sqrt{3}}{2}\sin\theta + \frac{1}{2}\cos\theta\right] - [-\cos\theta]\right]$$
$$\dot{\theta}\left[\frac{\sqrt{3}}{2}\cos\theta - \frac{1}{2}\sin\theta\right] + \left[[-\cos\theta] - \left[\frac{\sqrt{3}}{2}\sin\theta + \right.\right.$$
$$\left.\left.\frac{1}{2}\cos\theta\right]\right]\dot{\theta}\left[-\frac{\sqrt{3}}{2}\cos\theta - \frac{1}{2}\sin\theta\right]$$

-continued
$$(X-Y)\dot{Z}+(Y-Z)\dot{X}+(Z-X)\dot{Y}=\left[\sqrt{3}\sin\theta\right]$$
$$\dot{\theta}[\sin\theta]+\left[-\frac{\sqrt{3}}{2}\sin\theta+\frac{3}{2}\cos\theta\right]$$
$$\dot{\theta}\left[\frac{\sqrt{3}}{2}\cos\theta-\frac{1}{2}\sin\theta\right]+\left[-\frac{\sqrt{3}}{2}\sin\theta-\frac{3}{2}\cos\theta\right]$$
$$\dot{\theta}\left[-\frac{\sqrt{3}}{2}\cos\theta-\frac{1}{2}\sin\theta\right]$$

$$(X-Y)\dot{Z}+(Y-Z)\dot{X}+(Z-X)\dot{Y}=$$
$$\sqrt{3}\sin^2\theta\dot{\theta}+\left[-\sqrt{3}\sin\theta\cos\theta+\frac{3\sqrt{3}}{4}\cos^2\theta+\frac{\sqrt{3}}{4}\sin^2\theta-\frac{3}{4}\cos\theta\sin\theta\right]\dot{\theta}+\left[\sqrt{3}\sin\theta\cos\theta+\frac{3\sqrt{3}}{4}\cos^2\theta+\frac{\sqrt{3}}{4}\sin^2\theta+\frac{3}{4}\sin\theta\cos\theta\right]\dot{\theta}$$

$$(X-Y)\dot{Z}+(Y-Z)\dot{X}+(Z-X)\dot{Y}=$$
$$\sqrt{3}\sin^2\theta\dot{\theta}+\left[\frac{3\sqrt{3}}{4}\cos^2\theta+\frac{\sqrt{3}}{4}\sin^2\theta\right]$$
$$\dot{\theta}+\left[\frac{3\sqrt{3}}{4}\cos^2\theta+\frac{\sqrt{3}}{4}\sin^2\theta\right]\dot{\theta}$$

$$(X-Y)\dot{Z}+(Y-Z)\dot{X}+(Z-X)\dot{Y}=$$
$$\sqrt{3}\sin^2\theta\dot{\theta}+\left[\frac{3\sqrt{3}}{2}\cos^2\theta+\frac{\sqrt{3}}{2}\sin^2\theta\right]\dot{\theta}$$

$$(X-Y)\dot{Z}+(Y-Z)\dot{X}+(Z-X)$$
$$\dot{Y}=\left[\frac{3\sqrt{3}}{2}\sin^2\theta+\frac{3\sqrt{3}}{2}\cos^2\theta\right]\dot{\theta}$$

$$(X-Y)\dot{Z}+(Y-Z)\dot{X}+(Z-X)\dot{Y}=\frac{3\sqrt{3}}{2}\dot{\theta}$$

Now, if rate is computed again, but with the addition of 3$^{rd}$ harmonic signal distortion, then:

$$X=A\sin(\theta+30)+B\sin(3(\theta+30))$$
$$Y=A\sin(\theta+150)+B\sin(3(\theta+150))$$
$$Z=A\sin(\theta+270)+B\sin(3(\theta+270)),$$

and:

$$\dot{X}=A\dot{\theta}\cos(\theta+30)+B3\dot{\theta}\cos(3(\theta+30))$$
$$\dot{Y}=A\dot{\theta}\cos(\theta+150)+B3\dot{\theta}\cos(3(\theta+150))$$
$$\dot{Z}=A\dot{\theta}\cos(\theta+270)+B3\dot{\theta}\cos(3(\theta+270)).$$

As a result:

$$(X-Y)\dot{Z}+(Y-Z)\dot{X}+$$
$$(Z-X)\dot{Y}=[A\sin(\theta+30)+B\sin(3(\theta+30))-A\sin(\theta+150)-$$
$$B\sin(3(\theta+150))]\left[A\dot{\theta}\cos(\theta+270)+B3\dot{\theta}\cos(3(\theta+270))\right]+[A$$
$$\sin(\theta+150)+B\sin(3(\theta+150))-A\sin(\theta+270)-$$
$$B\sin(3(\theta+270))]\left[A\dot{\theta}\cos(\theta+30)+B3\dot{\theta}\cos(3(\theta+30))\right]+[A$$
$$\sin(\theta+270)+B\sin(3(\theta+270))-A\sin(\theta+30)-$$
$$B\sin(3(\theta+30))]\left[A\dot{\theta}\cos(\theta+150)+B3\dot{\theta}\cos(3(\theta+150))\right],$$

$$(X-Y)\dot{Z}+(Y-Z)\dot{X}+(Z-X)\dot{Y}=[A\sin\theta\cos30+A\cos\theta\sin30+$$
$$B\sin3\theta\cos90+B\cos3\theta\sin90-A\sin\theta\cos150-A\cos\theta\sin150-$$
$$B\sin3\theta\cos450-B\cos3\theta\sin450]\left[A\dot{\theta}\cos\theta\cos270-A\dot{\theta}\sin\theta\sin270+$$
$$B3\dot{\theta}\cos3\theta\cos810-B3\dot{\theta}\sin3\theta\sin810\right]+[A\sin\theta\cos150+$$
$$A\cos\theta\sin150+B\sin3\theta\cos450+B\cos3\theta\sin450-A\sin\theta\cos270-$$
$$A\cos\theta\sin270-B\sin3\theta\cos810-B\cos3\theta\sin810]\left[A\dot{\theta}\cos\theta\cos30-$$
$$A\dot{\theta}\sin\theta\sin30+B3\dot{\theta}\cos3\theta\cos90-B3\dot{\theta}\sin3\theta\sin90\right]+[A\sin\theta\cos270+$$
$$A\cos\theta\sin270+B\sin3\theta\cos810+B\cos3\theta\sin810-A\sin\theta\cos30-$$
$$A\cos\theta\sin30-B\sin3\theta\cos90-B\cos3\theta\sin90][A\dot{\theta}\cos\theta\cos150-$$
$$A\dot{\theta}\sin\theta\sin150+B3\dot{\theta}\cos3\theta\cos450-B3\dot{\theta}\sin3\theta\sin450],$$

$$(X-Y)\dot{Z}+(Y-Z)\dot{X}+(Z-X)\dot{Y}=\left[A\frac{\sqrt{3}}{2}\sin\theta+A\frac{1}{2}\cos\theta+\right.$$
$$B\cos3\theta+A\frac{\sqrt{3}}{2}\sin\theta-A\frac{1}{2}\cos\theta-B\cos3\theta\left.\right]\left[A\dot{\theta}\sin\theta-$$
$$B3\dot{\theta}\sin3\theta\right]+\left[-A\frac{\sqrt{3}}{2}\sin\theta+A\frac{1}{2}\cos\theta+B\cos3\theta+\right.$$
$$A\cos\theta-B\cos3\theta\left.\right]\left[A\frac{\sqrt{3}}{2}\dot{\theta}\cos\theta-A\frac{1}{2}\dot{\theta}\sin\theta-$$
$$B3\dot{\theta}\sin3\theta\right]+\left[-A\cos\theta+B\cos3\theta-A\frac{\sqrt{3}}{2}\sin\theta-A\frac{1}{2}\cos\theta-\right.$$
$$B\cos3\theta\left.\right]\left[-A\frac{\sqrt{3}}{2}\dot{\theta}\cos\theta-A\frac{1}{2}\dot{\theta}\sin\theta-B3\dot{\theta}\sin3\theta\right],$$

$$(X-Y)\dot{Z}+(Y-Z)\dot{X}+(Z-X)\dot{Y}=\left[A^2\frac{\sqrt{3}}{2}\dot{\theta}\sin^2\theta+\right.$$
$$A^2\frac{1}{2}\dot{\theta}\sin\theta\cos\theta+AB\dot{\theta}\sin\theta\cos3\theta+A^2\frac{\sqrt{3}}{2}\dot{\theta}\sin^2\theta-$$
$$A^2\frac{1}{2}\dot{\theta}\sin\theta\cos\theta-AB\dot{\theta}\sin\theta\cos3\theta-3AB\frac{\sqrt{3}}{2}\dot{\theta}\sin\theta\sin3\theta-$$
$$3AB\frac{1}{2}\dot{\theta}\sin3\theta\cos\theta-3B^2\dot{\theta}\sin3\theta-3AB\frac{\sqrt{3}}{2}\dot{\theta}\sin\theta\sin3\theta+$$
$$3AB\frac{1}{2}\dot{\theta}\sin3\theta\cos\theta+3B^2\dot{\theta}\sin3\theta\cos3\theta\right]+\left[-A^2\sqrt{3}\dot{\theta}\sin\theta\cos\theta+\right.$$
$$A^2\frac{\sqrt{3}}{4}\dot{\theta}\cos^2\theta+AB\frac{\sqrt{3}}{2}\dot{\theta}\cos\theta\cos3\theta+A^2\dot{\theta}\frac{\sqrt{3}}{2}\cos^2\theta-$$
$$AB\frac{\sqrt{3}}{2}\dot{\theta}\cos\theta\cos3\theta A^2\frac{\sqrt{3}}{4}\dot{\theta}\sin^2\theta-A^2\frac{1}{4}\dot{\theta}\sin\theta\cos\theta-AB\frac{1}{2}\dot{\theta}\sin\theta\cos3\theta-$$
$$A^2\frac{1}{2}\dot{\theta}\sin\theta\cos\theta+AB\frac{1}{2}\dot{\theta}\sin\theta\cos3\theta 3AB\frac{\sqrt{3}}{2}\dot{\theta}\sin\theta\sin3\theta-$$
$$3AB\frac{1}{2}\dot{\theta}\cos\theta\sin3\theta-3B^2\dot{\theta}\sin3\theta\cos3\theta-$$
$$3AB\dot{\theta}\cos\theta\sin3\theta+3B^2\dot{\theta}\sin3\theta\cos3\theta\right]+\left[A^2\frac{\sqrt{3}}{2}\dot{\theta}\cos^2\theta-\right.$$
$$AB\frac{\sqrt{3}}{2}\dot{\theta}\cos\theta\cos3\theta+A^2\sqrt{3}\dot{\theta}\sin\theta\cos\theta+A^2\frac{\sqrt{3}}{4}\dot{\theta}\cos^2\theta+$$
$$AB\frac{\sqrt{3}}{2}\dot{\theta}\cos\theta\cos3\theta A^2\frac{1}{2}\dot{\theta}\sin\theta\cos\theta-AB\frac{1}{2}\dot{\theta}\sin\theta\cos3\theta+A^2\frac{\sqrt{3}}{4}\dot{\theta}\sin^2\theta+$$
$$A^2\frac{1}{4}\dot{\theta}\sin\theta\cos\theta+AB\frac{1}{2}\dot{\theta}\sin\theta\cos3\theta 3AB\dot{\theta}\cos\theta\sin3\theta-3B^2\dot{\theta}\sin3\theta\cos3\theta+$$

-continued $$3AB\frac{\sqrt{3}}{2}\dot{\theta}\sin\theta\sin3\theta + 3AB\frac{1}{2}\dot{\theta}\cos\theta\sin3\theta + 3B^2\dot{\theta}\sin3\theta\cos3\theta\bigg],$$

$$(X-Y)\dot{Z}+(Y-Z)\dot{X}+(Z-X)\dot{Y} =$$

$$\dot{\theta}\bigg[A^2\frac{\sqrt{3}}{2}\sin^2\theta + A^2\frac{\sqrt{3}}{2}\sin^2\theta + A^2\frac{\sqrt{3}}{4}\sin^2\theta + A^2\frac{\sqrt{3}}{4}\sin^2\theta + $$

$$A^2\frac{1}{2}\sin\theta\cos\theta - A^2\frac{1}{2}\sin\theta\cos\theta - A^2\sqrt{3}\sin\theta\cos\theta - A^2\frac{1}{4}\sin\theta\cos\theta - $$

$$A^2\frac{1}{2}\sin\theta\cos\theta + A^2\sqrt{3}\sin\theta\cos\theta + A^2\frac{1}{2}\sin\theta\cos\theta + A^2\frac{1}{4}\sin\theta\cos\theta - $$

$$3AB\frac{\sqrt{3}}{2}\sin\theta\sin3\theta - 3AB\frac{\sqrt{3}}{2}\sin\theta\sin3\theta + 3AB\frac{\sqrt{3}}{2}\sin\theta\sin3\theta + $$

$$3AB\frac{\sqrt{3}}{2}\sin\theta\sin3\theta + AB\sin\theta\cos3\theta - AB\sin\theta\cos3\theta - AB\frac{1}{2}\sin\theta\cos3\theta + $$

$$AB\frac{1}{2}\sin\theta\cos3\theta - AB\frac{1}{2}\sin\theta\cos3\theta + AB\frac{1}{2}\sin\theta\cos3\theta + $$

$$AB\frac{\sqrt{3}}{2}\cos\theta\cos3\theta - AB\frac{\sqrt{3}}{2}\cos\theta\cos3\theta - AB\frac{\sqrt{3}}{2}\cos\theta\cos3\theta + $$

$$AB\frac{\sqrt{3}}{2}\cos\theta\cos3\theta - 3AB\frac{1}{2}\cos\theta\sin3\theta - 3AB\cos\theta\sin3\theta + $$

$$3AB\cos\theta\sin3\theta + 3AB\frac{1}{2}\cos\theta\sin3\theta - 3AB\frac{1}{2}\sin3\theta\cos\theta + $$

$$3AB\frac{1}{2}\sin3\theta\cos\theta 3B^2\sin3\theta\cos3\theta + 3B^2\sin3\theta\cos3\theta - 3B^2\sin3\theta\cos3\theta + $$

$$3B^2\sin3\theta\cos3\theta - 3B^2\sin3\theta\cos3\theta + 3B^2\sin3\theta\cos3\theta + $$

$$A^2\frac{\sqrt{3}}{4}\cos^2\theta + A^2\frac{\sqrt{3}}{2}\cos^2\theta + A^2\frac{\sqrt{3}}{2}\cos^2\theta + A^2\frac{\sqrt{3}}{4}\cos^2\theta\bigg],$$

$$(X-Y)\dot{Z}+(Y-Z)\dot{X}+(Z-X)\dot{Y} =$$

$$\dot{\theta}\bigg[A^2\frac{\sqrt{3}}{2}\sin^2\theta + A^2\frac{\sqrt{3}}{2}\sin^2\theta + A^2\frac{\sqrt{3}}{4}\sin^2\theta + A^2\frac{\sqrt{3}}{4}\sin^2\theta + $$

$$A^2\frac{\sqrt{3}}{4}\cos^2\theta + A^2\frac{\sqrt{3}}{2}\cos^2\theta + A^2\frac{\sqrt{3}}{2}\cos^2\theta + A^2\frac{\sqrt{3}}{4}\cos^2\theta\bigg],$$

$$(X-Y)\dot{Z}+(Y-Z)\dot{X}+(Z-X)\dot{Y} = \dot{\theta}\bigg[A^2\frac{3\sqrt{3}}{2}\sin^2\theta + A^2\frac{3\sqrt{3}}{2}\cos^2\theta\bigg],$$

and $$(X-Y)\dot{Z}+(Y-Z)\dot{X}+(Z-X)\dot{Y} = \dot{\theta}A^2\frac{3\sqrt{3}}{2}.$$

Hence, if a nominal signal amplitude of A=1 is assumed, then:

$$(X-Y)\dot{Z}+(Y-Z)\dot{X}+(Z-X)\dot{Y} = \dot{\theta}\frac{3\sqrt{3}}{2}.$$

This equation is identical to Equation 1, which proves that $3^{rd}$ harmonic signal distortion does not affect the output when this algorithm is implemented.

What is claimed is:

1. A method of generating a motor control signal for a motor having a rotor that rotates at a rotational rate, the method comprising the steps of:
   generating first, second, and third sinusoidal signals, each sinusoidal signal being 120-degrees out of phase with the other sinusoidal signals;
   differentiating the first, second, and third sinusoidal signals to obtain first, second, and third cosine signals, respectively;
   subtracting the first sinusoidal signal from the third sinusoidal signal to obtain a first sinusoidal difference signal;
   subtracting the second sinusoidal signal from the first sinusoidal signal to obtain a second sinusoidal difference signal;
   subtracting the third sinusoidal signal from the second sinusoidal signal to obtain a third sinusoidal difference signal;
   multiplying the first sinusoidal difference signal and the second cosine signal to obtain a first product signal;
   multiplying the second sinusoidal difference signal and the third cosine signal to obtain a second product signal;
   multiplying the third sinusoidal difference signal and the first cosine signal to obtain a third product signal;
   summing the first, second, and third product signals to obtain a summation signal; and
   multiplying the summation signal by a constant to obtain a rate signal that is proportional to the rotational rate of the rotor.

2. The method of claim 1, wherein the constant is selected from the group consisting of $$\frac{2}{3\sqrt{3}} \text{ and } \frac{1}{3\sqrt{3}}.$$

3. The method of claim 1, wherein the first, second, and third sinusoidal signals are generated by first, second, and third Hall-effect sensors.

4. The method of claim 1, wherein the rate signal is a first rate signal and wherein the method further comprises:
   obtaining a second rate signal that is proportional to the rotational rate of the rotor, the second rate signal 180-degrees out of phase with the first rate signal.

5. The method of claim 4, wherein the step of obtaining the second rate signal comprises:
   generating fourth, fifth, and sixth sinusoidal signals 120-degrees out of phase with each other, the fourth, fifth, and sixth sinusoidal signals 180-degrees out of phase with the first, second, and third sinusoidal signals, respectively;
   differentiating the fourth, fifth, and sixth sinusoidal signals to obtain fourth, fifth, and sixth cosine signals, respectively;
   subtracting the fourth sinusoidal signal from the sixth sinusoidal signal to obtain a fourth sinusoidal difference signal;
   subtracting the fifth sinusoidal signal from the fourth sinusoidal signal to obtain a fifth sinusoidal difference signal;
   subtracting the sixth sinusoidal signal from the fifth sinusoidal signal to obtain a sixth sinusoidal difference signal;
   multiplying the fourth sinusoidal difference signal and the fifth cosine signal to obtain a fourth product signal;
   multiplying the fifth sinusoidal difference signal and the sixth cosine signal to obtain a fifth product signal;
   multiplying the sixth sinusoidal difference signal and the fourth cosine signal to obtain a sixth product signal;
   summing the fourth, fifth, and sixth product signals to obtain a second summation signal; and
   multiplying the second summation signal by the constant to obtain the second rate signal.

6. The method of claim 5, further comprising:
adding the first and second rate signals to obtain compensated rate signal that is proportional to the rotational rate of the rotor.

7. The method of claim 1, further comprising:
obtaining a position signal representative of an instantaneous position of the rotor;
supplying the position signal and the rate signal to a complementary filter to obtain a filtered position signal and a filtered rate signal.

8. The method of claim 7, further comprising:
subtracting the filtered position signal from the position signal to obtain a position error signal;
applying a predetermined gain to the position error signal to obtain an adjusted position error signal;
integrating the position error signal to obtain a rate adjustment signal;
multiplying the rate signal and the rate adjustment signal to obtain an adjusted rate signal;
summing the adjusted rate signal and the adjusted position error signal to obtain the filtered rate signal; and
integrating the filtered rate signal to obtain the filtered position signal.

9. A motor controller, comprising:
first, second, and third sensor means for generating first, second, and third sinusoidal signals, respectively, each sinusoidal signal being 120-degrees out of phase with the other sinusoidal signals;
first, second, and third differentiation means for differentiating the first, second, and third sinusoidal signals, respectively, to generate first, second, and third cosine signals, respectively;
first subtraction means for subtracting the first sinusoidal signal from the third sinusoidal signal to generate a first sinusoidal difference signal;
second subtraction means for subtracting the second sinusoidal signal from the first sinusoidal signal to generate a second sinusoidal difference signal;
third subtraction means for subtracting the third sinusoidal signal from the second sinusoidal signal to generate a third sinusoidal difference signal;
first multiplication means for multiplying the first sinusoidal difference signal and the second cosine signal to generate a first product signal;
second multiplication means for multiplying the second sinusoidal difference signal and the third cosine signal to generate a second product signal;
third multiplication means for multiplying the third sinusoidal difference signal and the first cosine signal to generate a third product signal;
summing means for summing the first, second, and third product signals to generate a summation signal; and
fourth multiplication means for multiplying the summation signal by a constant to generate a rate signal that is proportional to the rotational rate of the rotor.

10. The controller of claim 9, wherein the constant is selected from the group consisting of $$\frac{2}{3\sqrt{3}} \text{ and } \frac{1}{3\sqrt{3}}.$$

11. The controller of claim 9, wherein the rate signal is a first rate signal and wherein the method further comprises:
fourth, fifth, and sixth sensor means for generating fourth, fifth, and sixth sinusoidal signals 120-degrees out of phase with each other, the fourth, fifth, and sixth sinusoidal signals 180-degrees out of phase with the first, second, and third sinusoidal signals, respectively;
fourth, fifth, and sixth differentiation means for differentiating the fourth, fifth, and sixth sinusoidal signals to obtain fourth, fifth, and sixth cosine signals, respectively;
fourth subtraction means for subtracting the fourth sinusoidal signal from the sixth sinusoidal signal to obtain a fourth sinusoidal difference signal;
fifth subtraction means for subtracting the fifth sinusoidal signal from the fourth sinusoidal signal to obtain a fifth sinusoidal difference signal;
sixth subtraction means for subtracting the sixth sinusoidal signal from the fifth sinusoidal signal to obtain a sixth sinusoidal difference signal;
fifth multiplication means for multiplying the fourth sinusoidal difference signal and the fifth cosine signal to obtain a fourth product signal;
sixth multiplication means for multiplying the fifth sinusoidal difference signal and the sixth cosine signal to obtain a fifth product signal;
seventh multiplication means for multiplying the sixth sinusoidal difference signal and the fourth cosine signal to obtain a sixth product signal;
second summing means for summing the fourth, fifth, and sixth product signals to obtain a second summation signal; and
eighth multiplication means for multiplying the second summation signal by the constant to obtain the second rate signal.

12. The controller of claim 11, further comprising:
third summing means for summing the first and second rate signals to obtain compensated rate signal that is proportional to the rotational rate of the rotor.

13. The controller of claim 9, further comprising:
rotor position determination means for generating a position signal representative of an instantaneous position of the rotor; and
a complementary filter coupled to receive the position signal and the rate signal and configured to supply a filtered position signal and a filtered rate signal.

14. The controller of claim 13, further comprising:
subtraction means for subtracting the filtered position signal from the position signal to supply a position error signal;
gain adjustment means for applying a predetermined gain to the position error signal to supply an adjusted position error signal;
first integration means for integrating the position error signal and supplying a rate adjustment signal;
multiplication means for multiplying the rate signal and the rate adjustment signal to generate an adjusted rate signal;
summing means for summing the adjusted rate signal and the adjusted position error signal to generate the filtered rate signal; and
second integration means for integrating the filtered rate signal to obtain the filtered position signal.

15. A motor control system, comprising:
a motor including a stator and a rotationally mounted rotor, the rotor configured, upon the stator being controllably energized, to rotate to a rotational position at a rotational rate;
first, second, and third sensors evenly spaced about the rotor to sense the rotational position thereof and supply first, second, and third sinusoidal sensor signals, respectively, each sinusoidal sensor signal being 120-degrees out of phase with the other sinusoidal sensor signals; and a motor controller coupled to receive each of the sinusoidal sensor signals and configured to controllably energize the stator from a power source, the motor controller comprising:

first, second, and third differentiation means for differentiating the first, second, and third sinusoidal signals, respectively, to generate first, second, and third cosine signals, respectively;

first subtraction means for subtracting the first sinusoidal signal from the third sinusoidal signal to generate a first sinusoidal difference signal;

second subtraction means for subtracting the second sinusoidal signal from the first sinusoidal signal to generate a second sinusoidal difference signal;

third subtraction means for subtracting the third sinusoidal signal from the second sinusoidal signal to generate a third sinusoidal difference signal;

first multiplication means for multiplying the first sinusoidal difference signal and the second cosine signal to generate a first product signal;

second multiplication means for multiplying the second sinusoidal difference signal and the third cosine signal to generate a second product signal;

third multiplication means for multiplying the third sinusoidal difference signal and the first cosine signal to generate a third product signal;

summing means for summing the first, second, and third product signals to generate a summation signal; and fourth multiplication means for multiplying the summation signal by a constant to generate a rate signal that is proportional to the rotational rate of the rotor.

16. The system of claim 15, wherein:

the rate signal is a first rate signal;

the system further comprises fourth, fifth, and sixth sensors evenly spaced about the rotor to sense the rotational rate thereof and supply fourth, fifth, and sixth sinusoidal sensor signals, respectively, each of the fourth, fifth, and sixth sinusoidal sensor signal being 120-degrees out of phase with each other, the fourth, fifth, and sixth sinusoidal signals additionally being 180-degrees out of phase with the first, second, and third sinusoidal signals, respectively; and the motor controller further comprises:

fourth, fifth, and sixth differentiation means for differentiating the fourth, fifth, and sixth sinusoidal signals to obtain fourth, fifth, and sixth cosine signals, respectively;

fourth subtraction means for subtracting the fourth sinusoidal signal from the sixth sinusoidal signal to obtain a fourth sinusoidal difference signal;

fifth subtraction means for subtracting the fifth sinusoidal signal from the fourth sinusoidal signal to obtain a fifth sinusoidal difference signal;

sixth subtraction means for subtracting the sixth sinusoidal signal from the fifth sinusoidal signal to obtain a sixth sinusoidal difference signal;

fifth multiplication means for multiplying the fourth sinusoidal difference signal and the fifth cosine signal to obtain a fourth product signal;

sixth multiplication means for multiplying the fifth sinusoidal difference signal and the sixth cosine signal to obtain a fifth product signal;

seventh multiplication means for multiplying the sixth sinusoidal difference signal and the fourth cosine signal to obtain a sixth product signal;

second summing means for summing the fourth, fifth, and sixth product signals to obtain a second summation signal; and eighth multiplication means for multiplying the second summation signal by the constant to obtain the second rate signal.

17. The system of claim 16, wherein the motor controller further comprises:

second summing means for summing the first and second rate signals to obtain compensated rate signal that is proportional to the rotational rate of the rotor.

18. The system of claim 15, further comprising:

rotor position determination means for generating a position signal representative of an instantaneous position of the rotor; and a complementary filter coupled to receive the position signal and the rate signal and configured to supply a filtered position signal and a filtered rate signal.

19. The method of claim 18, further comprising:

subtraction means for subtracting the filtered position signal from the position signal to supply a position error signal;

gain adjustment means for applying a predetermined gain to the position error signal to supply an adjusted position error signal;

first integration means for integrating the position error signal and supplying a rate adjustment signal;

multiplication means for multiplying the rate signal and the rate adjustment signal to generate an adjusted rate signal;

summing means for summing the adjusted rate signal and the adjusted position error signal to generate the filtered rate signal; and second integration means for integrating the filtered rate signal to obtain the filtered position signal.

* * * * *